Sept. 30, 1952     J. MAHLER     2,612,079
PROCESS OF MAKING LIGHT POLARIZERS
Filed May 12, 1948     2 SHEETS—SHEET 2
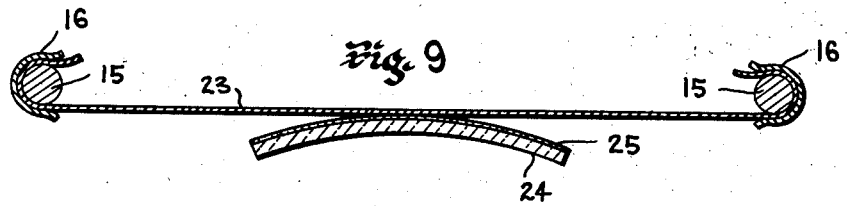
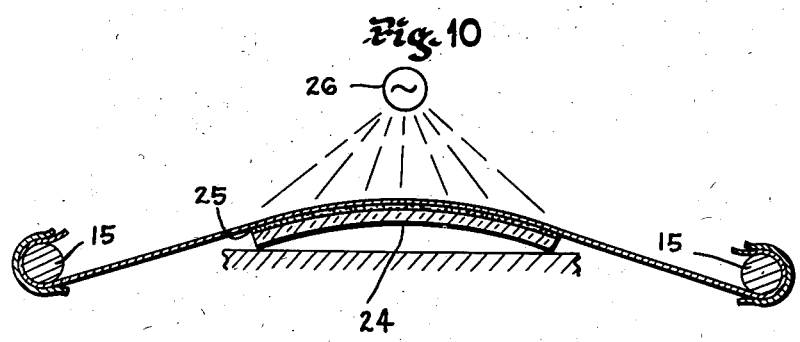
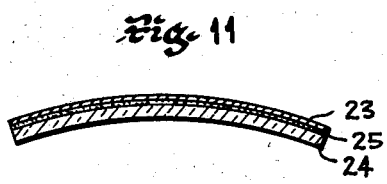
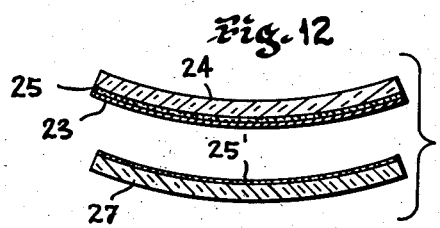
INVENTOR.
JOSEPH MAHLER
BY
*Louis L. Gagnon*
ATTORNEY Patented Sept. 30, 1952

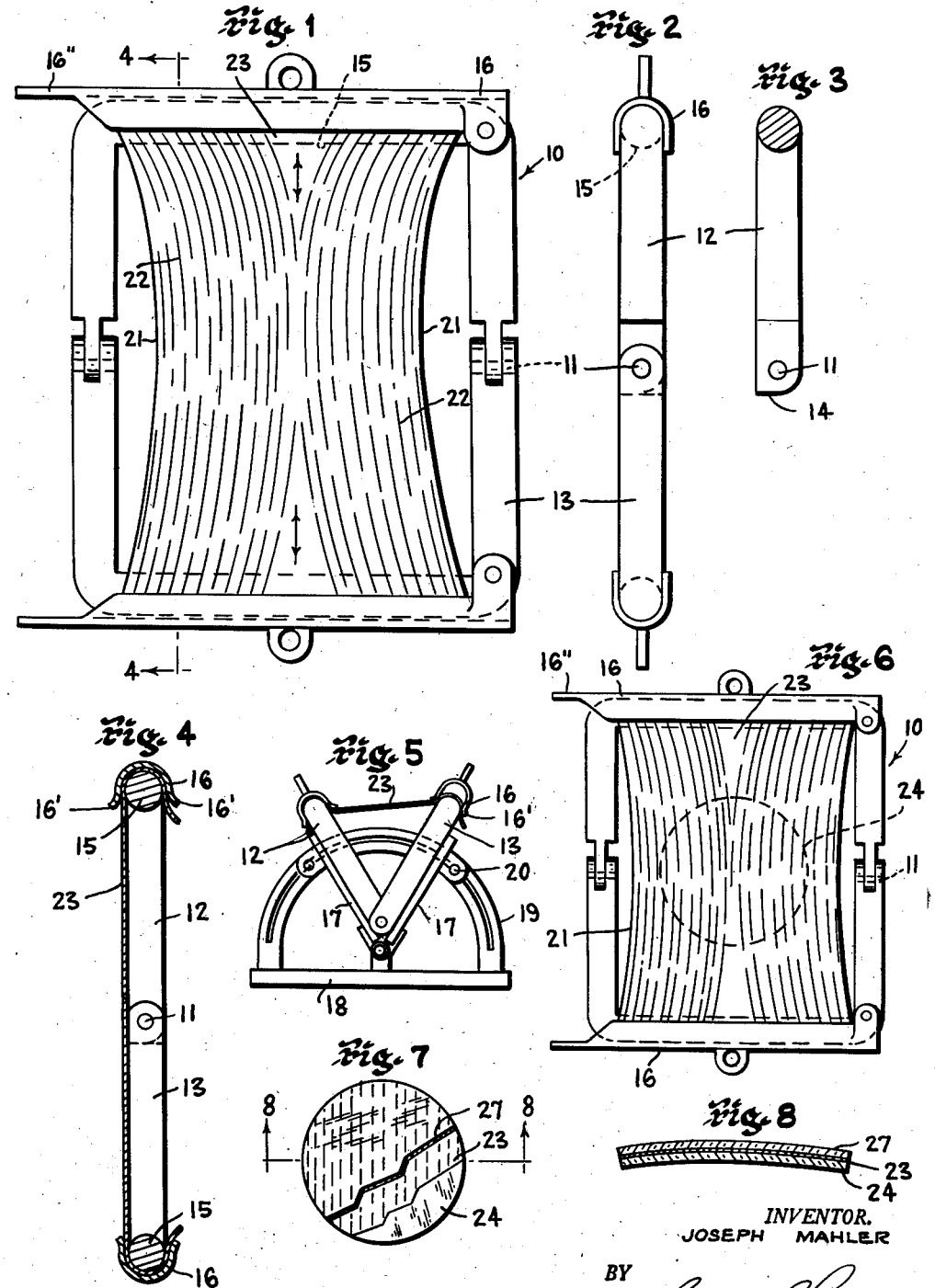

2,612,079

UNITED STATES PATENT OFFICE 2,612,079

PROCESS OF MAKING LIGHT POLARIZERS

Joseph Mahler, Brookline, Mass., assignor to American Optical Company, Southbridge, Mass., a voluntary association of Massachusetts Application May 12, 1948, Serial No. 26,668

4 Claims. (Cl. 88—65)

This invention relates to light polarizing films and particularly to light polarizing films of polyvinyl alcohol, and the process of making the same.

The present application is a continuation in part of my earlier filed application bearing Serial Number 704,413, filed October 19, 1946 and issued as Patent 2,515,830, July 18, 1950.

It is now well known that the molecules of certain groups of plastics can be oriented into parallelism and, when such plastics so treated are stained with polarizing dye, for example, a dichroic dye, a light polarizer is formed. The plastics aforesaid cannot be stretched to effect the orientation of the molecules thereof until they have been softened by heating. When a sheet of plastic is softened by heating and then stretched to secure the desired orientation of its molecules, the sheet is likely to split in the direction in which it is stretched, which, of course, is the direction of the orientation of its molecules. For this reason, it is impossible to laminate such material to curved surfaces; in fact, the lamination thereof to flat surfaces is difficult and is successful only when great care is used.

In order to handle a film which has been stretched after heating, it is necessary to secure it to a film base, such as cellulose acetate or the like. A polarized film anchored to a base film cannot be laminated to a curved lens or between two curved lenses because the base, being stiff, does not readily assume the curvature of the lens or lenses or adhere thereto.

Another difficulty preventing the lamination of a polarizer having its molecules oriented in linear parallelism to a curved lens or between curved lenses is that a substantial distortion of the polarizer will result when it is forced out of its original plane surface to assume the configuration of the lens.

When a sheet of such plastics has been softened by heat and stretched to orient the molecules thereof, the surface of the film is hardened to such an extent that a dichroic dye cannot readily penetrate the surface thereof and if the time of treatment is extended in order to secure the necessary penetration, the distribution of the dye is not uniform even in small areas.

It is highly desirable that a polarized sun glass, if used by one whose vision is defective, should comprise optical glass lenses ground in accordance with the lenses of the spectacles worn by such user. If the user does not have defective vision requiring correction by spectacles, it is desirable that the polarized film of his sun glasses should be laminated to a curvilinear surface for the reason that when the polarizer is laminated to a plane surface, the glasses form a mirror which reflects into the user's eyes light impinging upon the rearward surface of the glasses.

It is therefore a principal object of my invention to provide a plastic the molecules of which may be oriented and stained to form a polarizer without first softening the same by heat.

It is another of the objects of my invention to provide such a polarizer of polyvinyl alcohol.

Another object is to provide a polarizer formed of polyvinyl alcohol and having such qualities that it is capable of lamination to a curvilinear surface without splitting.

Another object is to provide a lamination or sheet of polarized polyvinyl alcohol having its molecules oriented curvilinearly, that is to say, one having its molecules oriented on both sides of its longitudinal axis, the orientation on each of the sides of the sheet being convex to that of the other.

Another object is to provide a sun glass lens, or other lens, comprising one or a pair of curvilinear lenses of optical glass having a polarizing film of polyvinyl alcohol laminated to one such lens or interposed between a pair of lenses, such lenses eventually to be ground by an optician to fit the eyes of the user.

Another object is to provide a process for producing a sheet of polyvinyl alcohol which is substantially water insoluble, which has high flexibility when moistened, which is stretchable at a temperature even as low as 1° C., to orient its molecules, and which, when such molecules are oriented curvilinearly, is capable of application to, and will assume the shape of, a curved surface without splitting and can be bonded thereto by a suitable adhesive.

Other objects of my invention will appear from the detailed description of the particular embodiments thereof selected to explain the principles underlying the same.

In the drawings,

Figure 1 is a plan view of one form of device that may be used for stretching a film to orient the molecules thereof.

Fig. 2 is a side view of the same.

Fig. 3 is a side view partly in section of the upper side of said device.

Fig. 4 is a section taken on the line 4—4 of Fig. 1.

Fig. 5 is an elevation of one form of gauge that may be used with the stretching device.

Fig. 6 is a plan view on a smaller scale indicating a curvilinearly polarized film and the curvilinear lens to which it is to be laminated.

Fig. 7 is a plan view of two curvilinear lenses having a polarized film laminated thereto.

Fig. 8 is a section on the line 8—8 of Fig. 7.

Figs. 9, 10, 11, and 12, are diagrams illustrating the several stages in the lamination of my polarizer between two curvilinear lenses.

I have found that when a sheet of polyvinyl alcohol, which is water soluble, is treated with a suitable reagent in the manner hereinafter set forth, the physical characteristics of such sheet are so altered that the sheet is of low water solubility, in fact, practically water insoluble, has high flexibility when in moistened condition, is readily stretchable at "room" temperatures (20° C.) or even at as low as 1° C., to orient its molecules and is capable of application to a curved splitting in the direction of orientation and that surface, assuming the shape thereof without said sheet, if stained with a dichroic or other suitable dye, becomes an efficient polarizer.

I have found that suitable reagents for treating a sheet of polyvinyl alcohol are solutions of alkali metal salts, such, for example, as a solution of sodium sulphate having a concentration of about 100 grams per liter of water or a solution of sodium phosphate (monobasic) or potassium phosphate (monobasic) of about the same concentration. While potassium sulphate (monobasic), sodium phosphate (monobasic) and sodium sulphate work particularly well, it is to be understood that my invention is not limited specifically to the use of these reagents, for resorcinol may also be used with good results.

The time of treatment of the sheet depends upon its thickness and the temperature of the bath. for example, for a sheet of plastic having a thickness of about .003 inch, and a bath temperature of about 1° C., the time of treatment will be about three minutes and if the temperature of the bath is about 20° C., such time will be about one minute. If the sheet were of a greater thickness, the time interval would be proportionately longer.

A sheet of the material treated as above will readily accept a dichroic or other suitable dye which will almost instantaneously distribute itself uniformly into the plastic after the molecules thereof have been oriented, thereby making a polarizer of the proper density and shade.

While at the present time I prefer sodium sulphate as a reagent for giving polyvinyl alcohol the properties outlined above, it is to be understood that sodium sulphate and potassium phosphate (monobasic) are full chemical equivalents, producing products which aside from their differences in degree of water solubility and acidity are full chemical equivalents and that sodium phosphate is the chemical equivalent of potassium phosphate, for this purpose.

When the molecules as above described are oriented curvilinearly, there will be two sets of such oriented molecules, one on either side of the axis of stretch of the film; that is to say, the central longitudinal axis, if, as shown in Fig. 1, the film is stretched longitudinally, as indicated by the arrow, and the orientation on one of the sides of the film will be convex to that of the other.

There is shown in Fig. 1, a stretcher which I have found convenient for orienting the molecules of plastic sheets treated as above set forth. The stretcher comprises two flattened U-shaped members 10 hinged together in any suitable manner, as indicated at 11. In the present instance, the flattened lower ends of the side members 12 extend into the bifurcated upper ends of the sides 13, and preferably, as indicated at 14, the conformation of the lower ends of said flattened portions is such that the two U-shaped members can be rotated to lie in the same plane, or only slightly beyond such plane. Pivoted to each of the cross bars, 15, near one end thereof, is a clamp 16, comprising an arcuate clip of spring material of substantially the same length as the cross bars and constructed to embrace and snap over the latter to securely hold the ends of the sheet to be treated to the cross bars. Each said clip has a circumferential length slightly greater than 180°, and the outer edges thereof are flared outwardly, as shown at 16'. The free edge of each clip terminates in a finger piece 16" extending beyond the cross bars.

Any suitable holder may be employed to retain the stretcher in semi-closed position, preparatory to clamping the ends of a sheet of plastic to the cross bars. In Fig. 5, I have shown such holder comprising the plates 17, which are pivoted to a bracket rising from the base 18. The angle between the plates which, of course, governs the angle between the side members of the stretcher having been determined, the plates may be clamped to the semi-circular guide 19 by screw 20. Having determined the degree of stretch of the film, the plates are set at the proper angle and the stretcher disposed in the holder between them as indicated in Fig. 5. The ends of the film are now placed over the bars 15 and firmly clamped thereto by the clips 16, one of which, in Fig. 5, is shown in open position. The stretcher will now be removed from the holder and immersed in the chemical bath above specified, and after remaining there the proper length of time, the side members of the stretcher will be rotated about their pivot until the two U-shaped members lie in the same plane.

As indicated by the lines 21, 21, the width of the film will be progressively reduced from its respective ends to its central portion. The direction of orientation of its molecules will be curvilinear, as indicated by the broken lines 22. The sheet, which is now extremely flexible, will bond to the convex surface of a lens, such as that shown at 24, a suitable adhesive or bonding material 25 having first been placed on said surface of the lens.

This may, preferably, be done by grasping the ends of the stretcher and placing the central portion of the surface of the film against the convex surface of said lens (Fig. 9) and then forcing the film down over said convex surface (Figs. 6 and 10). Thereafter, by an infra-red heat lamp 26, or other suitable heating means, the film and bonding material are quickly dried. The film is then removed from the frame and the portions extending beyond the periphery of the lens are trimmed off. A coating of bonding material 25' is now placed over the concave surface of the other lens 27 and the lens 24 with the film bonded thereto is pressed firmly down on the concave surface of the lens 27 (Fig. 12) thereby forming the laminated curvilinearly polarized lens shown in Figs. 7 and 8.

As indicated in Fig. 7 the curvilinear orientation obtained when the stretched surface of the film is substantially planary is changed to substantially linear parallel orientation when the film is laminated to the spherical curvature of the lens. Thus where the radius of curvature of the lens, and its diametrical dimension is known, by controlling the initial dimensions of the film, when in position on the stretcher, before stretching and the length of the stretcher, a desired curvilinear orientation of the molecules of the sheet may be obtained on stretching that will be transformed into an orientation in linear parallelism when said film is changed from a plane to the spherical curvature of the surface of the lens. For example, for a 50 mm. lens having a 6 diopter curve, which is the curvature of the usual sun-glass lens, I have found that a film of plastic having an initial width of about 3⅜ inches when wet and stretched from an initial length of 1½ inches to a stretched length of 5 inches will have substantially linear parallel orientation of its molecules when laminated to a lens of such curvature. It is pointed out that when laminating an unstretched planary film to the curved surface of the lens, the orientation of the molecules is changed so that its axis of absorption is deformed from parallelism to a convex or O-shaped pattern. Applicant proposes to initially stretch the film so as to provide a concave pattern (lines of orientation having their convex sides disposed toward each other on either side of the axis of stretch of the film) on the film such that when the film is laminated to the lens this convex or O-shape pattern will not form but the convexly opposed lines will be deformed to linear parallelism. The film need only be of an initial width sufficient that the lines of orientation tangent to the opposed sides of the lens will be of the required curvature which will deform when the film is laminated to the curved surface of the lens to straight parallel lines. In obtaining this straight line parallelism of the resultant lines of orientation in the final curved article the amount of deformation present during the actual laminating of the film to the lens must also be considered. Thus in the example, the ends of the film held by the clips are moved downwardly about an inch from a plane position tangent to the center of the lens. This distance as well as the change in dimensions of the film by stretching will of course vary proportionately from the example given, according to the curvature of the surface to which the film is to be bonded. Almost any degree of curvilinear orientation may be initially obtained for the film by varying its initial width and the amount of stretching. Likewise the amount of tension exerted on the film during the laminating process controls the accuracy of the resultant parallelism. The important feature is that sufficient control be exercised so that the lines of orientation are initially so convexly disposed to each other on either side of the axis of stretch that when laminated to the curved shape of the lens said lines assume straight linear parallelism and do not assume a concave relation with each other on opposed sides of said axis of stretch so as to provide an open area free of orientation adjacent the center of the lens.

I do not, however, desire to be understood as limiting myself to a polarizer sheet of polyvinyl alcohol, the molecules of which are oriented curvilinearly, because I believe it to be broadly new to produce a plane polarizer of said plastic material the molecules of which are oriented in parallelism without first softening the plastic sheet by heat.

Having thus described illustrative embodiments of my invention without, however, limiting the same thereto, what I claim and desire to secure by Letters Patent is:

1. The process of forming a light polarizer comprising bathing a preformed unstretched sheet of solid polyvinyl alcohol in an aqueous solution of an alkali metal neutral salt where the salt embodies in the neighborhood of ten per cent by weight of the solution for a time interval sufficient to render the sheet stretchable at near room temperature, and then stretching the sheet while in its moistened state to orient the molecules thereof, said process including the step of dyeing the sheet with a dichroic stain whereby the molecules when so dyed and oriented will provide the sheet with the desired light polarizing characteristics.

2. The process of forming a light polarizer comprising the steps of bathing a preformed unstretched sheet of solid polyvinyl alcohol in an aqueous solution of an alkali metal neutral salt where the salt embodies in the neighborhood of ten per cent by weight of the solution for a time interval sufficient to render the sheet stretchable at near room temperature, then stretching the sheet while in its moistened state to orient the molecules thereof, dyeing the said molecularly oriented sheet with a dichroic dye to provide the desired light polarizing characteristics, and while in a moistened condition laminating the dyed and stretched sheet to a transparent rigid support.

3. The process of forming a light polarizer comprising the steps of bathing a preformed unstretched sheet of solid polyvinyl alcohol in an aqueous solution of an alkali metal neutral salt for a time interval sufficient to render the sheet stretchable at near room temperature, said salt being selected from the group consisting of sodium phosphate, sodium sulphate, potassium phosphate and potassium sulphate and embodying in the neighborhood of ten per cent by weight of the solution, then stretching the sheet while in its moistened state to orient the molecules thereof, and dyeing the said molecularly oriented sheet with a dichroic dye to provide the desired light polarizing characteristics.

4. The process of forming a light polarizer comprising the steps of bathing a preformed unstretched sheet of solid normally water soluble polyvinyl alcohol in water for a time interval sufficient to render the sheet stretchable at about room temperature, the water containing dissolved therein a material substantially inert to polyvinyl alcohol and of a character and contained in such proportion as to inhibit the tendency of the water to dissolve the polyvinyl alcohol sheet while allowing it to soften to a condition where it is stretchable at room temperature, and stretching the sheet while in its moistened state to orient the molecules thereof, said process at one stage thereof including the step of dyeing the sheet with a polarizing stain whereby the desired light polarizing characteristics will be obtained.

JOSEPH MAHLER.

REFERENCES CITED

The following references are of record in the file of this patent:

UNITED STATES PATENTS

| Number | Name | Date |
| --- | --- | --- |
| 2,146,295 | Herrmann | Feb. 7, 1939 |
| 2,236,061 | Izard | Mar. 25, 1941 |
| 2,237,567 | Land | Apr. 8, 1941 |
| 2,246,087 | Bailey et al. | June 17, 1941 |
| 2,255,940 | Rogers | Sept. 16, 1941 |
| 2,263,249 | Rogers | Nov. 18, 1941 |
| 2,284,590 | Rogers | May 26, 1942 |
| 2,398,506 | Rogers | Apr. 16, 1946 |
| 2,445,579 | Hyman et al. | July 20, 1948 |